US008113719B2

(12) United States Patent
Waseda

(10) Patent No.: US 8,113,719 B2
(45) Date of Patent: Feb. 14, 2012

(54) CAGE AND THRUST ROLLER BEARING EQUIPPED WITH THE CAGE

(75) Inventor: Yoshitaka Waseda, Nisshin (JP)

(73) Assignee: Jtekt Corporation, Osaka-Shi, Osaka (JP)

(*) Notice: Subject to any disclaimer, the term of this patent is extended or adjusted under 35 U.S.C. 154(b) by 761 days.

(21) Appl. No.: 12/232,976

(22) Filed: Sep. 26, 2008

(65) Prior Publication Data

US 2009/0087128 A1 Apr. 2, 2009

(30) Foreign Application Priority Data

Sep. 28, 2007 (JP) ................................ 2007-253805

(51) Int. Cl.
*F16C 33/46* (2006.01)

(52) U.S. Cl. ...................................................... 384/623

(58) Field of Classification Search .................. 384/623, 384/621

See application file for complete search history.

(56) References Cited

U.S. PATENT DOCUMENTS 6,843,605 B2 1/2005 Tamada et al.
2007/0280575 A1* 12/2007 Obayashi et al. ............. 384/623
2007/0297707 A1 12/2007 Hayashi et al.

FOREIGN PATENT DOCUMENTS

EP 1 298 334 A1 9/2002
EP 1 818 555 A1 11/2005
JP 10-252654 9/1998
JP 2003-83333 (A) 3/2003
JP 2005-273755 A 10/2005
JP 2006-242199 (A) 9/2006

OTHER PUBLICATIONS

European Search Report dated Jan. 23, 2009.
Notification of Reason(s) for Refusal dated Nov. 1, 2011, with English translation.

* cited by examiner

*Primary Examiner* — Thomas R Hannon
(74) *Attorney, Agent, or Firm* — McGinn IP Law Group, PLLC

(57) ABSTRACT

A cage includes a radially inward-side annular plate, a radially outward-side annular wall, a plurality of pillar portions, and pockets formed in the pillar portions. Rollers are rotatably retained in the pockets. An inner peripheral surface of the radially outward-side annular wall is formed so as to be oblique toward a radially outward direction. A radially outward-side end surface of each of the rollers has a spherical surface shape.

7 Claims, 7 Drawing Sheets

CAGE AND THRUST ROLLER BEARING EQUIPPED WITH THE CAGE

INCORPORATION BY REFERENCE

The disclosure of Japanese Patent Application No. 2007-253805 filed on Sep. 28, 2007 including the specification, drawings and abstract is incorporated herein by reference in its entirety.

BACKGROUND OF THE INVENTION

1. Field of the Invention

The invention relates to a cage in which a plurality of pockets for retaining rollers on a one-to-one basis are provided at a plurality of locations in a circumferential direction, a production method for the cage, and a thrust roller bearing equipped with the cage.

2. Description of the Related Art

As shown in FIG. 4, a thrust roller bearing is composed of a pair of race members 60, 70, a plurality of rollers 10 interposed between the two race members 60, 70, and a cage 20 that retains the plurality of rollers 10 with predetermined intervals left therebetween in the circumferential direction. This cage 20 has, for example, a radially inward-side annular plate 40, a radially outward-side annular wall 51, and a plurality of pillar portions 30 between the annular plate 40 and the annular wall 51. The cage 20 is formed so as to have a generally letter "W" sectional shape. Pockets 31 are formed between the pillar portions 30 that are adjacent to the radially inward-side annular plate 40 and to the radially outward-side annular wall 51. Besides, stopper protrusions 33*a*, 33*b* are protruded into each pocket 31 from surfaces 33 of adjacent pillar portions 30 that face each other, specifically, from a radially intermediate portion and two radially end portions of each surface 33. This structure has been known in the field. The cage 20 constructed in this manner is produced by a press process of forming the cage 20 and, simultaneously with or after the press process, a blanking process in which the pockets 31 are formed by blanking. Besides, simultaneously with the blanking process, the stopper protrusions 33*a*, 33*b* are formed. This kind of thrust roller bearing is described in, for example, Japanese Patent Application Publication No. 10-252654 (JP-A-10-252654).

However, in the above-described cage 20, the occurrence of so-called chipping in which in the blanking process, a blanking punch 90 scrapes an outer peripheral surface 40*a* of the radially inward-side annular plate 40 or an inner peripheral surface 51*a* of the radially outward-side annular wall 51 is prevented. Therefore, as shown in FIG. 5, the outside diameter of the blanking punch 90 is slightly smaller than the distance between the outer peripheral surface 40*a* of the radially inward-side annular plate 40 and the inner peripheral surface 51*a* of the radially outward-side annular wall 51. The provision of such a difference for securing a clearance between the blanking punch 90 and both the outer peripheral surface 40*a* of the radially inward-side annular plate 40 and the inner peripheral surface 51*a* of the radially outward-side annular wall 51, thereby preventing the occurrence of the above-described chipping. Therefore, as shown in FIG. 4, inner wall surfaces 42, 52 formed by blanking the pockets 31 have portions that are protruded relative to the outer peripheral surface 40*a* of the radially inward-side annular plate 40 and the inner peripheral surface 51*a* of the radially outward-side annular wall 51, respectively. Due to the presence of the portions protruded relative to the outer peripheral surface 40*a* of the radially inward-side annular plate 40 or the inner peripheral surface 51*a* of the radially outward-side annular wall 51, when the thrust roller bearing is connected to, for example, a main shaft of a swash plate type compressor (not shown), and the swash plate type compressor is driven, the rollers 10 are given centrifugal force due to the revolution of the rollers 10, so that as shown in FIG. 6, the rollers 10 shift in the pockets 31 to the radially outward-side. As a result, of the two inner wall surfaces 42, 52, the inner wall surface 52, which is located at the radially outward-side, are partially in contact with radially outward-side end surfaces 10*a* of the rollers 10. This contact state causes a problem of abrasion occurring on the inner wall surface 52 and the radially outward-side end surfaces 10*a* of the rollers 10 (i.e., abrasion of a sold-shaded portion in an enlarged partial view in FIG. 6). In order to solve this problem, it has been considered that the pockets 31 are blanked so that as shown in FIG. 7 the inner peripheral surface 51*a* of the radially outward-side annular wall 51 is flush with the radially outward-side inner wall surface 52 formed by blanking the pockets 31. However, in order to perform the blanking in this manner, the pockets 31 needs to be blanked out closely along the inner peripheral surface 51*a* of the radially outward-side annular wall 51. Thus, there is difficulty from the viewpoint of preventing the foregoing chipping.

SUMMARY OF THE INVENTION

The invention provides a cage that rotatably retains, in the pockets, rollers whose end surfaces on the radially outward side are spherical, and that prevents the abrasion that occurs between the inner wall surfaces of the pockets and the radially outward-side end surfaces of the rollers even in the case where the radially outward-side end surfaces of the rollers contact the inner wall surfaces of the pockets, and also provides a production method for the cage, and a thrust roller bearing equipped with the cage.

A first aspect of the invention is a roller cage that includes: a radially inward-side annular plate; a radially outward-side annular wall; a plurality of pillar portions formed between the radially inward-side annular plate and the radially outward-side annular wall, with a predetermined interval provided between the plurality of pillar portions; pockets formed in the pillar portions. In the cage, the plurality of pillar portions are formed at a plurality of locations in a circumferential direction of the radially inward-side annular plate and the radially outward-side annular wall, and rollers are rotatably retained in the pockets, and an inner peripheral surface of the radially outward-side annular wall is formed so as to be oblique toward a radially outward direction, and a radially outward-side end surface of each of the rollers has a spherical surface shape. When a thrust roller bearing employing a cage constructed as described above is connected to, for example, a main shaft of a swash plate type compressor, and the swash plate type compressor is driven so that the rollers are shifted in the pockets to the radially outward-side by centrifugal force as shown in FIG. 3, only the vicinity of the center of the end radially outward-side end surface of each roller come into contact with the inner peripheral surface of the radially outward-side annular wall. Therefore, the radially outward-side end surface of each roller excluding the vicinity of the center of the spherical surface shape does not contact the inner wall surface of a corresponding one of the pockets, which is located on the radially outward-side thereof. Therefore, the occurrence of abrasion between the radially outward-side end surfaces of the rollers and the inner wall surfaces of the pockets can be prevented.

A second aspect of the invention relates to a thrust roller bearing. The thrust roller bearing includes: a pair of race members; a plurality of rollers interposed between the pair of race members; a radially inward-side annular plate, a radially outward-side annular wall, a plurality of pillar portions formed between the radially inward-side annular plate and the radially outward-side annular wall, with a predetermined interval provided between the plurality of pillar portions, and pockets formed in the pillar portions. In the thrust roller bearing, the plurality of pillar portions are formed at a plurality of locations in a circumferential direction of the radially inward-side annular plate and the radially outward-side annular wall, and the rollers are rotatably retained in the pockets, and an inner peripheral surface of the radially outward-side annular wall is formed so as to be oblique from an axis direction toward a radially outward direction, and a radially outward-side end surface of each of the rollers has a spherical surface shape.

A third aspect of the invention relates to a production method for a cage of rollers that includes a radially inward-side annular plate, a radially outward-side annular wall, a plurality of pillar portions formed between the radially inward-side annular plate and the radially outward-side annular wall, with a predetermined interval provided between the plurality of pillar portions, and pockets formed in the pillar portions. This production method includes, a press process of forming the cage, and a blanking process of blanking out the pockets simultaneously with the press process or after the press process. In the press process, an inner peripheral surface of the radially outward-side annular wall is formed so as to be oblique from an axis direction toward a radially outward direction. In the blanking process, the pockets are blanked out along the inner peripheral surface of the radially outward-side annular wall. According to this production method, a cage that achieves the foregoing operation and effects can be produced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
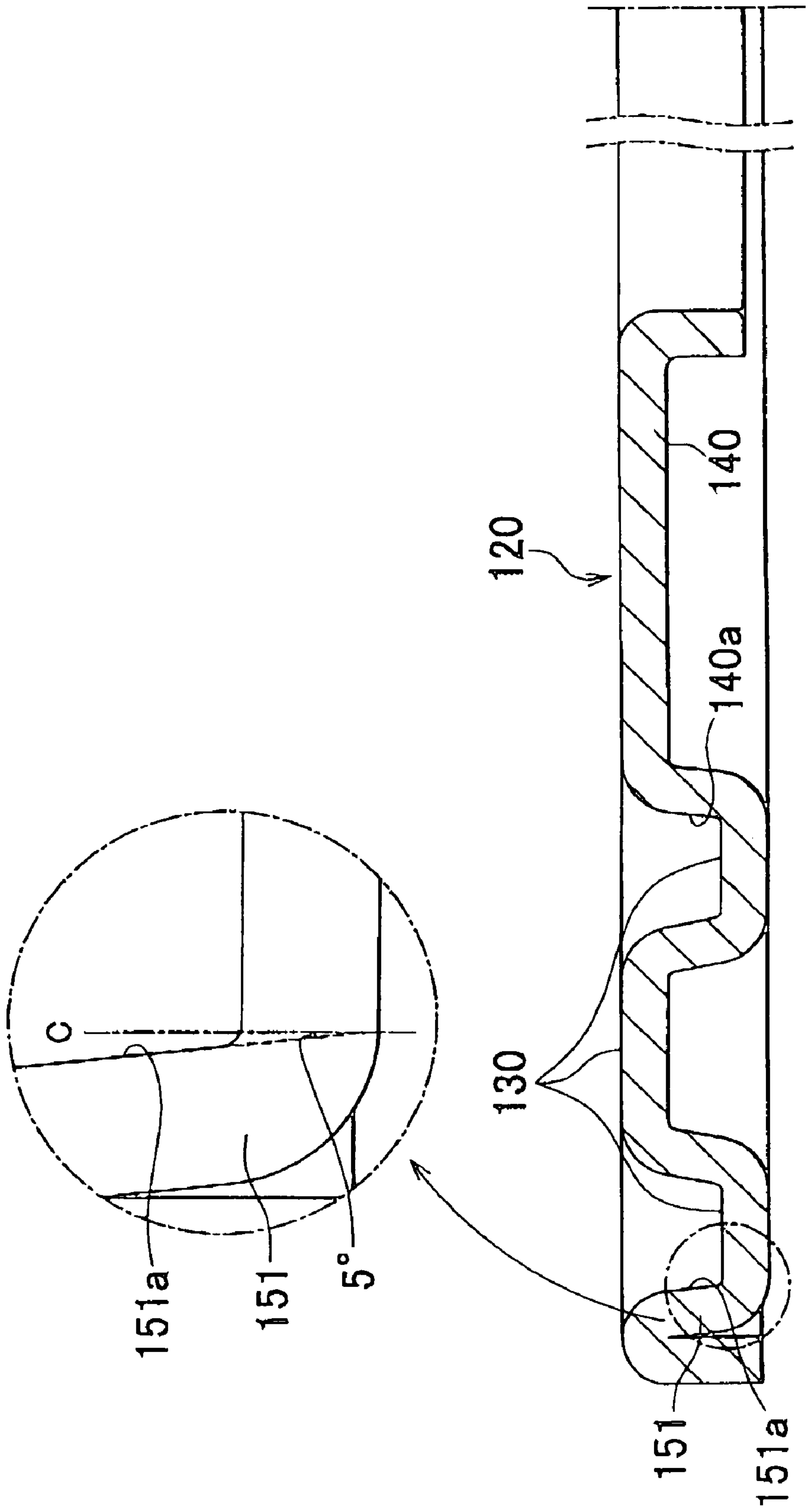
FIG. 1 is a diagram illustrating a press process in accordance with an embodiment of the invention, and shows a state of a cage in a vertical cross-section.
Figure 2:
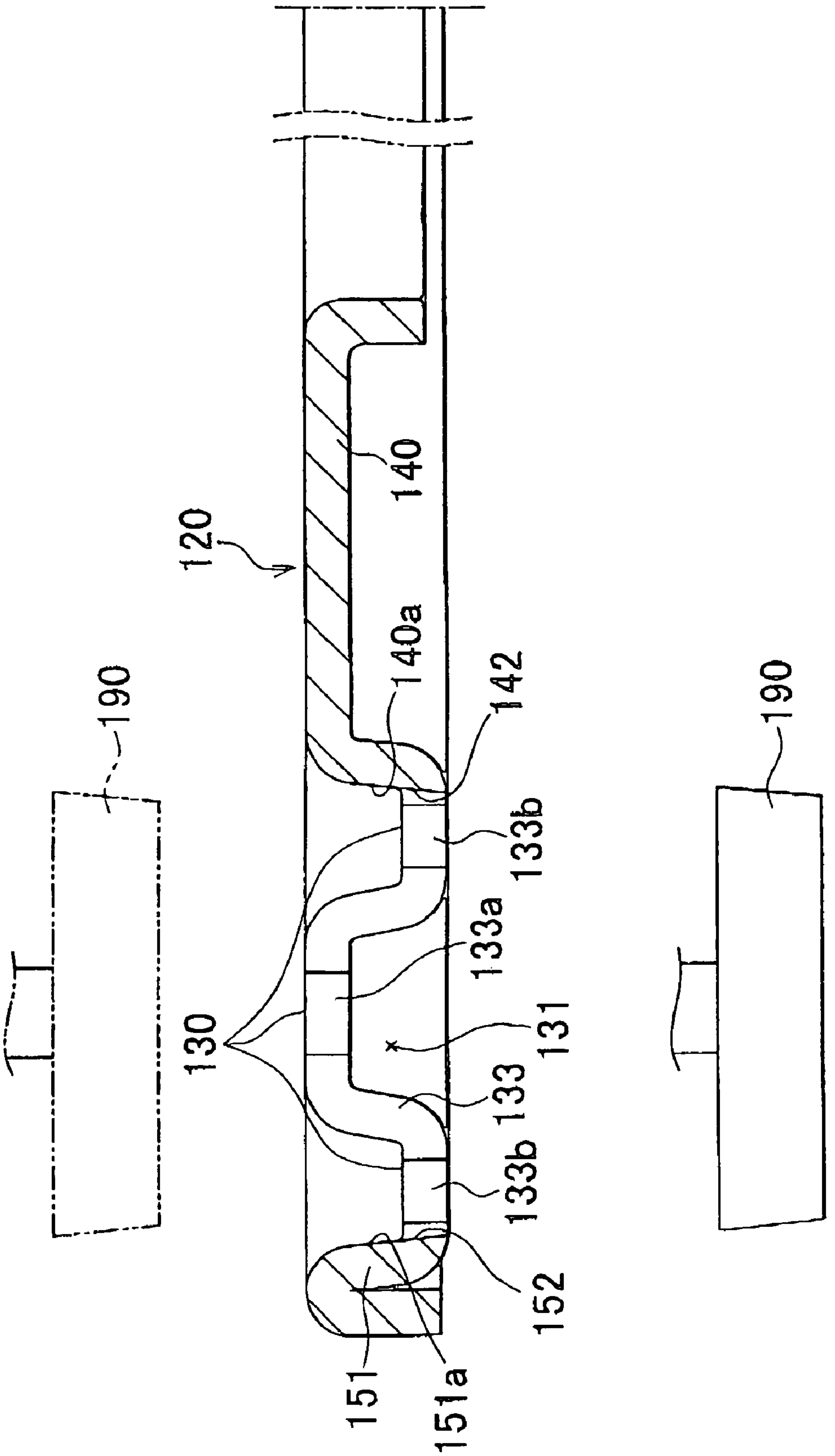
FIG. 2 is a diagram illustrating a blanking process in accordance with the embodiment of the invention, and shows a state of the cage in a vertical cross-section.
Figure 3:
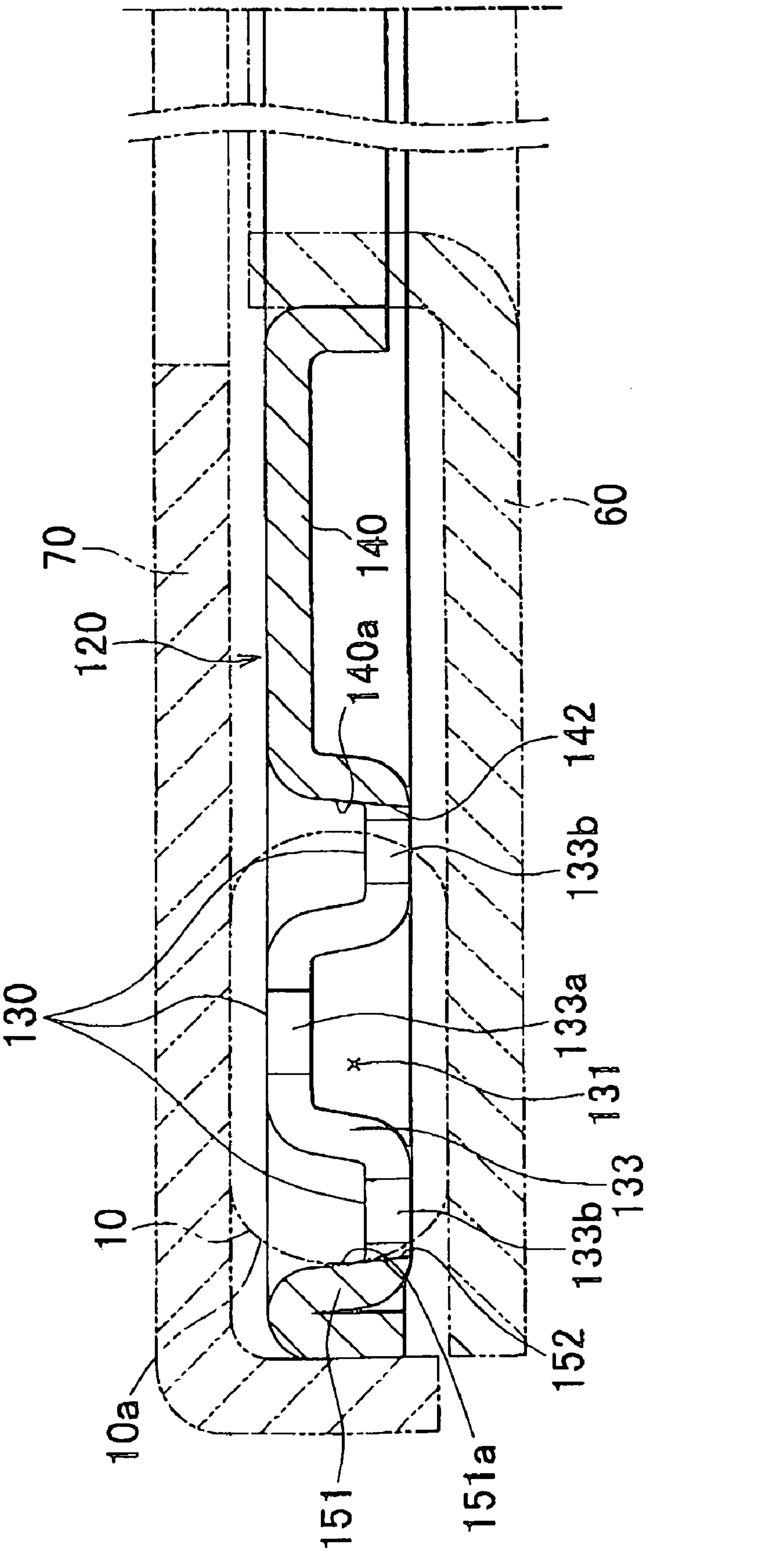
FIG. 3 is a vertical sectional view of a cage that is in use in accordance with the embodiment of the invention.
Figure 4:
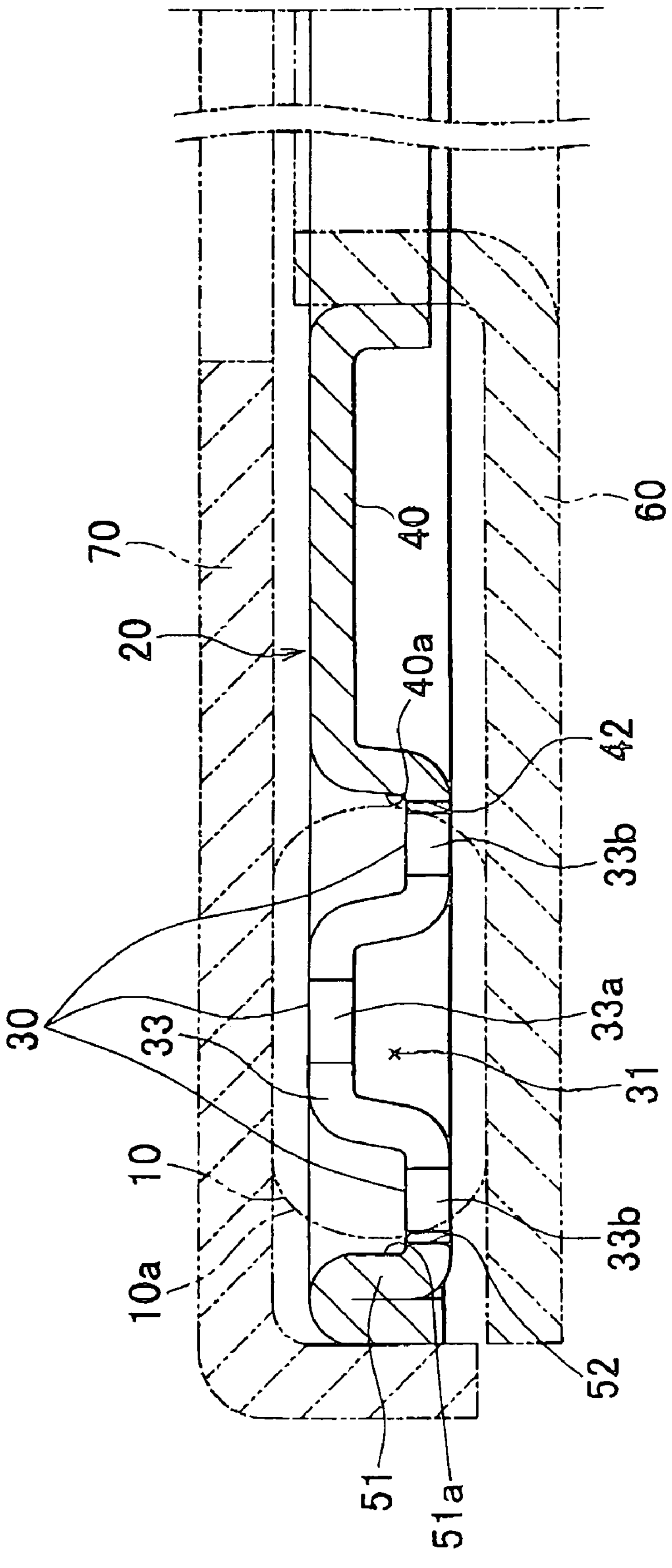
FIG. 4 is a vertical sectional view of a cage of a related art.
Figure 5:
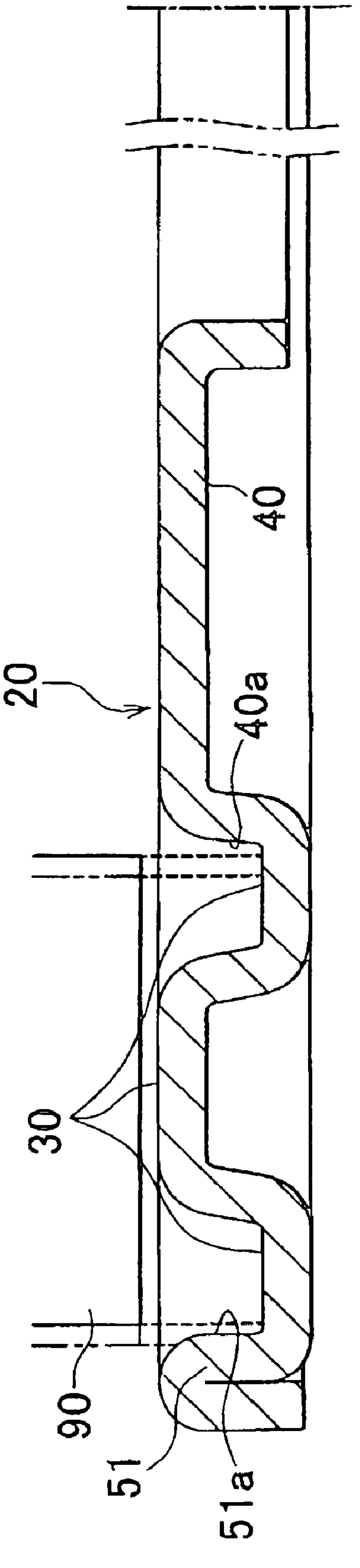
FIG. 5 is a diagram illustrating a blanking process in the related art.
Figure 6:
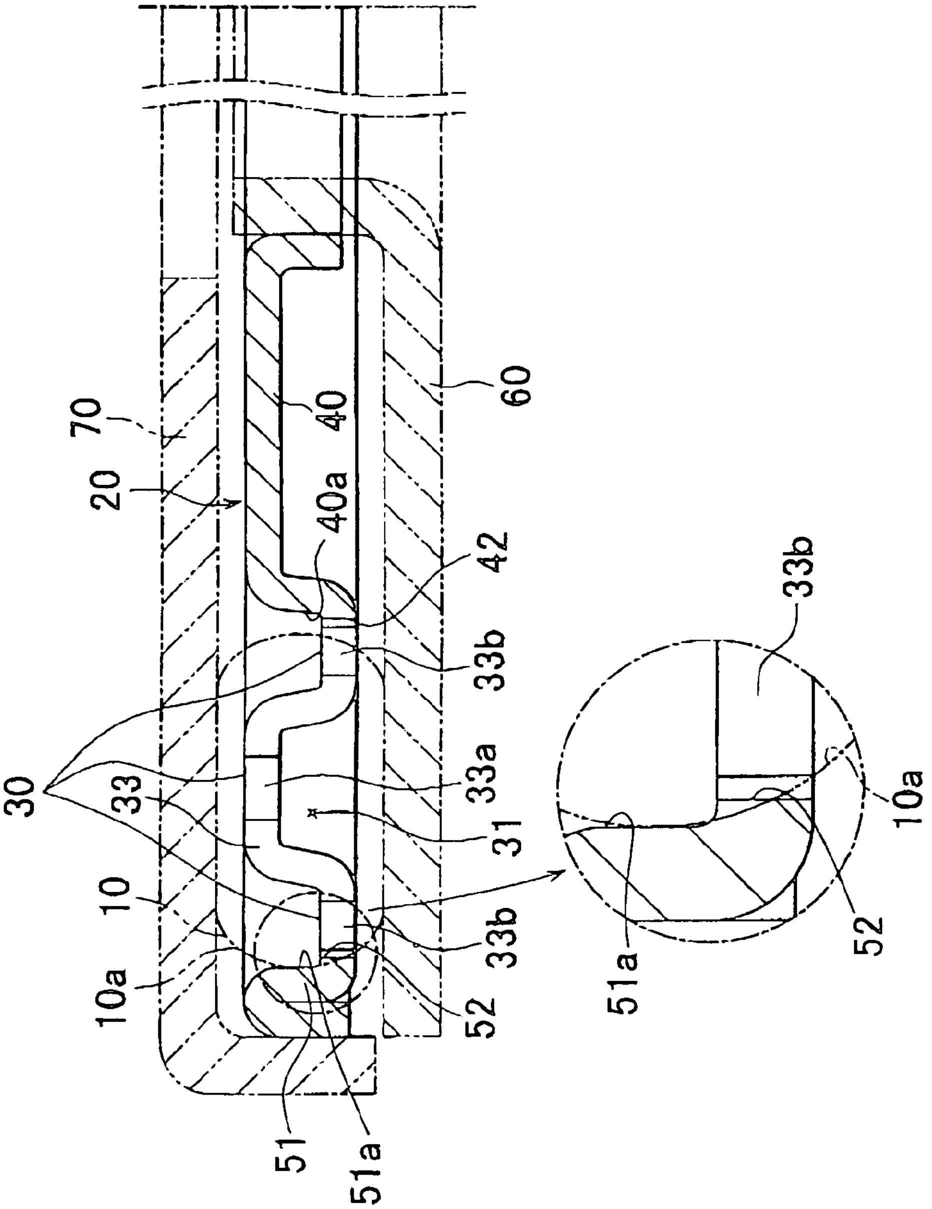
FIG. 6 is a vertical sectional view of a case of the related art that is in use.
Figure 7:
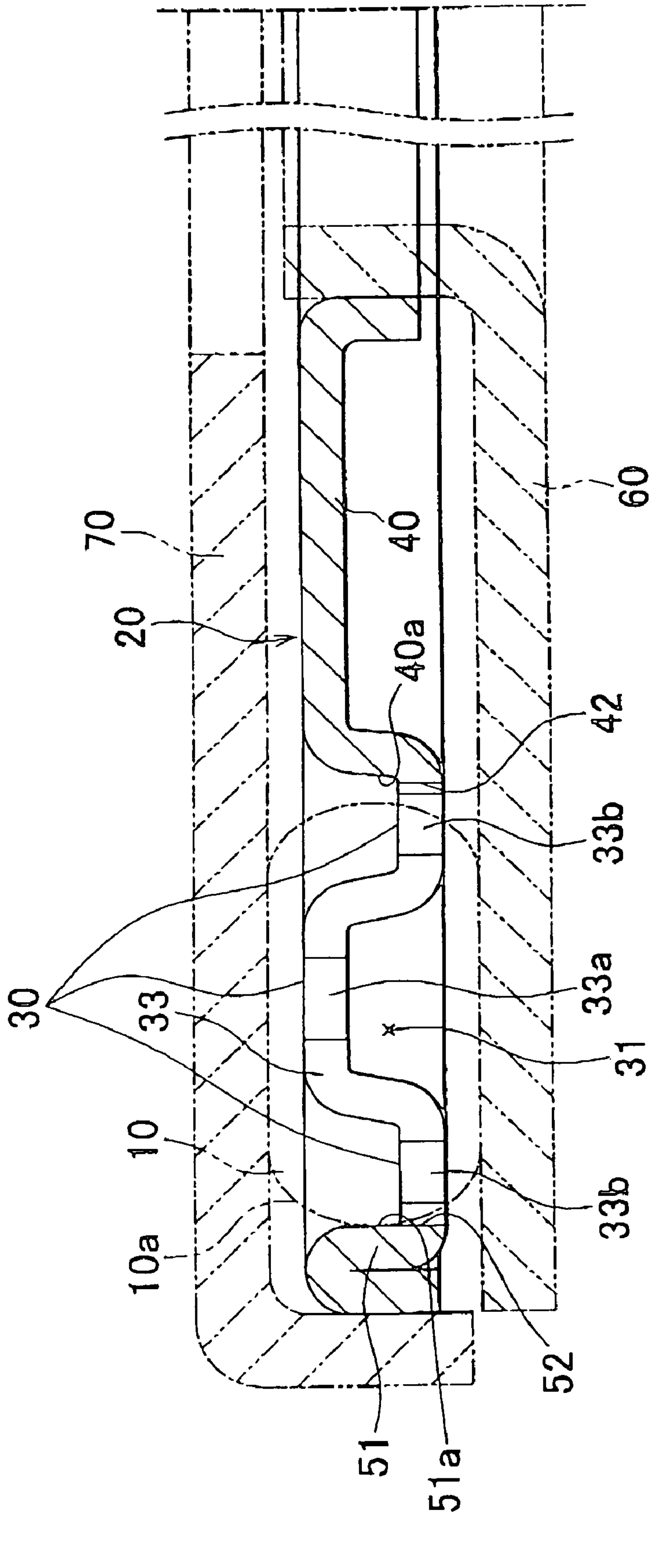
FIG. 7 is a vertical sectional view of an ideal cage.

Embodiments of the invention will be described hereinafter with reference to FIGS. 1 to 3. FIG. 1 is a diagram illustrating a press process in accordance with an embodiment of the invention, and shows a state of a cage in a vertical cross-section. FIG. 2 is a diagram illustrating a blanking process in accordance with the embodiment of the invention, and shows a state of the cage in a vertical cross-section. FIG. 3 is a vertical sectional view of a cage that is in use in accordance with the embodiment of the invention.

Firstly, with reference to FIGS. 1 to 2, a production method for a cage in accordance with an embodiment of the invention will be described. Initially, a press process as described above in conjunction with the related art is carried out, thereby forming a radially inward-side annular plate 140, a radially outward-side annular wall 151, and a plurality of pillar portions 130 between the radially inward-side annular plate 140 and the radially outward-side annular wall 151 with predetermined intervals left between the pillar portions 130. Thus, a generally letter "W" sectional shape of the case is formed. Incidentally, the plurality of pillar portions 130 are formed at a plurality of locations in the circumferential direction of the annular plate 140 and the annular wall 151. As shown in an enlarged partial view in FIG. 1, an inner peripheral surface 151*a* of the radially outward-side annular wall 151 is formed to be oblique, for example, at an angle of 5°, with respect to an axis direction C so that the inner peripheral surface 151*a* extends in such a direction (a leftward direction in FIG. 1) that the radially outward-side annular wall 151 expands radially outwards. The axis direction herein refers to, for example, the direction of a main shaft when the thrust roller bearing is connected to the main shaft of a swash plate type compressor. Besides, in this embodiment, an outer peripheral surface 140*a* of the radially inward-side annular plate 140 is also formed to be oblique at an angle of 5°.

Next, a blanking process as described above in conjunction with the related art is carried out (see FIG. 2). As shown in FIG. 2, pockets 131 are blanked out along the two oblique peripheral surfaces 140*a*, 151*a* of the radially inward-side annular plate 140 and the radially outward-side annular wall 151 by a blanking punch 190. Besides, in order to carry out the blanking process as described above, outer peripheral surfaces of the blanking punch 190 that correspond to the two peripheral surfaces 140*a*, 151*a* of the radially inward-side annular plate 140 and the radially outward-side annular wall 151 have a taper shape in which the outer peripheral surfaces become narrower toward the end in the blanking direction.

The cage 120 produced in this manner includes the radially inward-side annular plate 140, the radially outward-side annular wall 151, and a plurality of pillar portions 130 that are formed between the annular plate 140 and the annular wall 151 with predetermined intervals left between the pillar portions 130. The cage 120 has a generally letter "W" sectional shape. Incidentally, the plurality of pillar portions 130 are formed at a plurality of locations in the circumferential direction of the annular plate 140 and the annular wall 151. Besides, the pockets 131 are formed in the pillar portions 130. An intermediate portion of each of surfaces 133 of each pillar portion that face each other in the circumferential direction of the thrust roller bearing is provided with a stopper protrusion 133*a* that is protruded into the pocket 131 of the pillar portion 130, so that the stopper protrusions 133*a* of the two surfaces 133 are protruded toward each other. Furthermore, two opposite end portions of each surface 133 in the radial direction of the thrust roller bearing are also provided with stopper protrusions 133*b* that are protruded into the pocket 131, so that the stopper protrusions 133*b* of one of the two surfaces 133 that face each other and the stopper protrusions 133*b* of the other one of the surfaces 133 are protruded toward each other.

Within each of the pockets 131 of the cage 120, a roller 10 is rotatably retained, stopped by the stopper protrusions 133*a*, 133*b*. In a state in which the rollers 10 are retained in the pockets 131, the rollers 10 are prevented from falling out of the pockets 131 in one of the two opposite axis directions by the stopper protrusions 133*a* provided in intermediate portions of the surfaces 133 in the radial direction, and the falling-out of the rollers 10 from the pockets 131 in the other one of the opposite axis directions is prevented by the stopper protrusions 133*b* provided on the end portions of the surfaces 133 in the radial direction.

This cage 120 is used, as shown in FIG. 3, as a component member of a thrust roller bearing for retaining a plurality of rollers 10 that are interposed between a pair of race members 60, 70, with predetermined intervals left between the rollers 10.

The cage 120 in accordance with this embodiment is produced by a method as described above. According to this production method, the pockets 131 are blanked out by the blanking punch 190 along the inclined peripheral surfaces 140*a*, 151*a* of the radially inward-side annular plate 140 and the radially outward-side annular wall 151, so that the so-called chipping does not occur when the pockets 131 are blanked out.

According to this production method, the two inner wall surfaces 142, 152 formed by blanking out the pockets 131 are not protruded with respect to the peripheral surfaces 140*a*, 151*a* of the radially inward-side annular plate 140 and the radially outward-side annular wall 151, unlike the two inner wall surfaces 42, 52 described above in conjunction with the related art. Therefore, when a thrust roller bearing employing this cage 120 is connected to, for example, the main shaft of a swash plate type compressor and the swash plate type compressor is driven so that the rollers 10 are shifted in the pockets 131 to the radially outward-side as shown in FIG. 3 by the centrifugal force caused by the revolution of the rollers 10, each of the rollers 10 comes into contact with the inner peripheral surface 151*a* of the radially outward-side annular wall 151 only at the vicinity of the center of a radially outward-side end surface 10*a* of the roller 10 which form a spherical surface shape. Therefore, the radially outward-side end surface 10*a* of each roller 10 excluding the vicinity of the center of the spherical surface shape does not contact the inner wall surface 152, which is located on the radially outward-side of the pockets 131. Hence, the occurrence of abrasion between the two surfaces 152, 10*a* can be prevented.

What is described above is merely about one embodiment of the invention, and it does not mean that the invention is limited to what is described above. In the foregoing embodiment, the peripheral surfaces 140*a*, 151*a* of the radially inward-side annular plate 140 and the radially outward-side annular wall 151 are both oblique. However, the invention is not limited to this construction, but it suffices that at least the inner peripheral surface 151*a* of the radially outward-side annular wall 151 be oblique. Since the rollers 10 are shifted to the radially outward-side by the centrifugal force, abrasion does not occur on the radially inward side.

Besides, in the foregoing embodiment, the inner peripheral surface 151*a* of the radially outward-side annular wall 151 is oblique at an angle of 5° with respect to the axis direction C so that the inner peripheral surface 151*a* lies in such a direction (a leftward direction in FIG. 1) that the radially outward-side annular wall 151 expands toward the radially outward direction. However, the invention is not limited to this construction. Instead, the inner peripheral surface 151*a* of the radially outward-side annular wall 151 may be formed with any inclination angle as long as, for example, when a thrust roller bearing employing this cage 120 is connected to, for example, the main shaft of a swash plate type compressor and the swash plate type compressor is driven, the end surfaces 10*a* of the rollers 10 and the radially outward-side inner wall surfaces 152 of the pockets 131 that are formed by blanking out the pockets 131 do not contact each other.

What is claimed is:

1. A roller cage comprising:

a radially inward-side annular plate;

a radially outward-side annular wall;

a plurality of pillar portions formed between the radially inward-side annular plate and the radially outward-side annular wall, with a predetermined interval provided between the plurality of pillar portions;

pockets formed in the pillar portions, wherein:

the plurality of pillar portions are formed at a plurality of locations in a circumferential direction of the radially inward-side annular plate and the radially outward-side annular wall;

rollers are rotatably retained in the pockets;

an inner peripheral surface of the radially outward-side annular wall, including a surface extending through said pockets, is formed so as to be oblique toward a radially outward direction; and a radially outward-side end surface of each of the rollers has a spherical surface shape.

2. The roller cage according to claim 1, wherein the inner peripheral surface of the radially outward-side annular wall comprises a flush surface.

3. The roller cage according to claim 1, wherein an outer peripheral surface of the radially inward-side annular plate is formed so as to be oblique toward a radially inward direction.

4. The roller cage according to claim 1, wherein a surface of each of the plurality of pillar portions that faces an adjacent one of the pockets has a protruded portion that is protruded toward the adjacent pocket.

5. The roller cage according to claim 1, wherein a vicinity of a center of the spherical surface shape of each roller contacts the inner peripheral surface of the radially outward-side annular wall.

6. The roller cage according to claim 1, wherein only a vicinity of a center of the spherical surface shape of each roller contacts the inner peripheral surface of the radially outward-side annular wall.

7. A thrust roller bearing comprising:

a pair of race members;

a plurality of rollers interposed between the pair of race members;

a roller cage comprising a radially inward-side annular plate, a radially outward-side annular wall, a plurality of pillar portions formed between the radially inward-side annular plate and the radially outward-side annular wall, with a predetermined interval provided between the plurality of pillar portions, and pockets formed in the pillar portions, wherein:

the plurality of pillar portions are formed at a plurality of locations in a circumferential direction of the radially inward-side annular plate and the radially outward-side annular wall;

the rollers are rotatably retained in the pockets;

an inner peripheral surface of the radially outward-side annular wall, including a surface extending through said pockets, is formed so as to be oblique toward a radially outward direction; and a radially outward-side end surface of each of the rollers has a spherical surface shape.

* * * * *